Feb. 27, 1923.

J. W. SKELTON.
FLYTRAP.
FILED APR. 26, 1921.

Inventor
J. W. Skelton.

By Lacey & Lacey, Attorneys

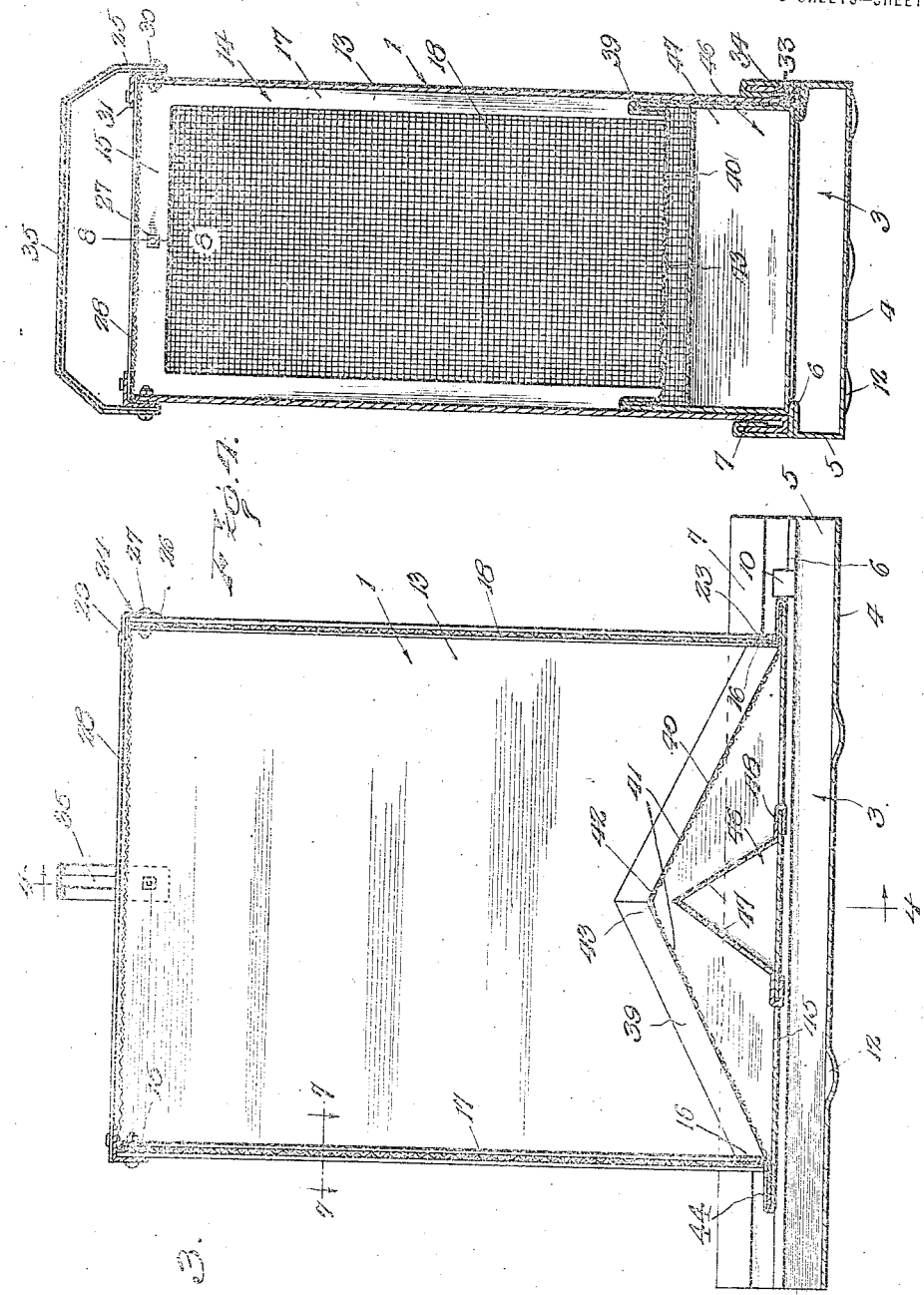

Feb. 27, 1923.

J. W. SKELTON.
FLYTRAP.
FILED APR. 26, 1921.

Inventor
J. W. Skelton.

By Lacy & Lacy, Attorneys

Patented Feb. 27, 1923.

1,446,940

UNITED STATES PATENT OFFICE.

JOHN W. SKELTON, OF DOUGLAS, ARIZONA.

FLYTRAP.

Application filed April 26, 1921. Serial No. 464,498.

*To all whom it may concern:*

Be it known that I, JOHN W. SKELTON, a citizen of the United States, residing at Douglas, in the county of Cochise and State of Arizona, have invented certain new and useful Improvements in Flytraps, of which the following is a specification.

This invention relates to improvements in fly traps and has as its object to provide a trap construction which may be readily formed from sheet metal and wire mesh material.

Another object of the invention is to so construct the trap that the several component parts thereof may be readily separated when it is desired to discharge the trapped insects after they have been exterminated, and the parts again readily assembled.

Another object of the invention is to so construct the trap that the same will be durable, capable of trapping and holding the maximum number of insects, and capable of being conveniently carried about from place to place.

In the accompanying drawings:

Figure 3 is a vertical longitudinal sectional view through the trap;

Figure 4 is a vertical transverse sectional view on the line 4—4 of Figure 3;

Figure 1:
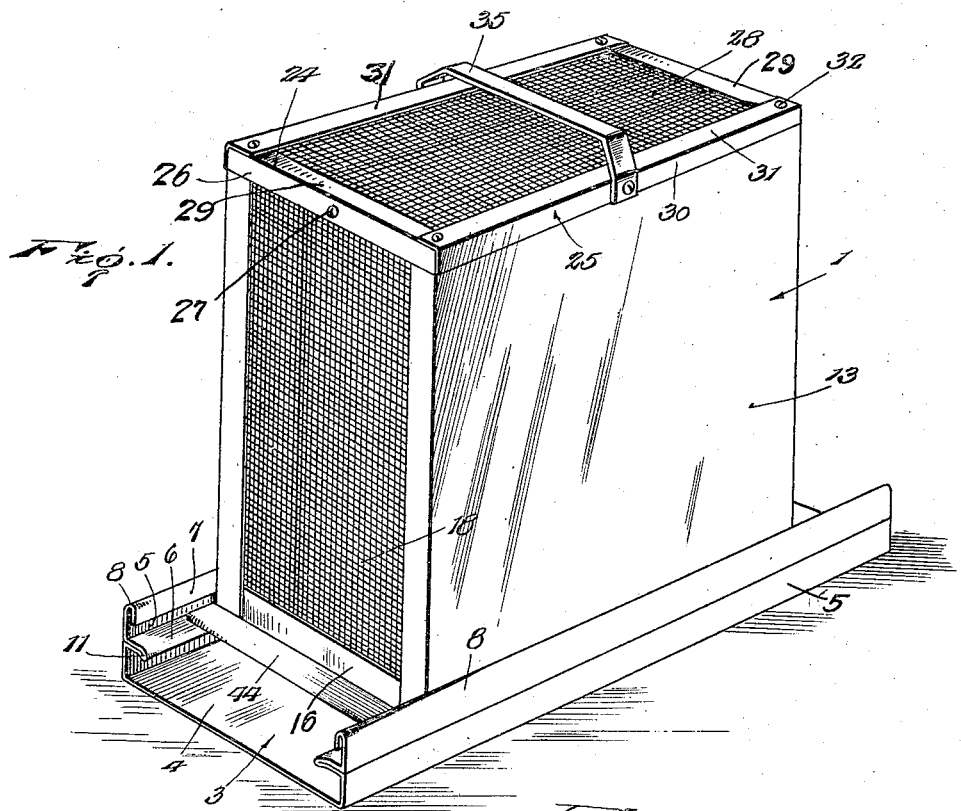
Figure 1 is a perspective view of the trap embodying the invention.
Figure 2:
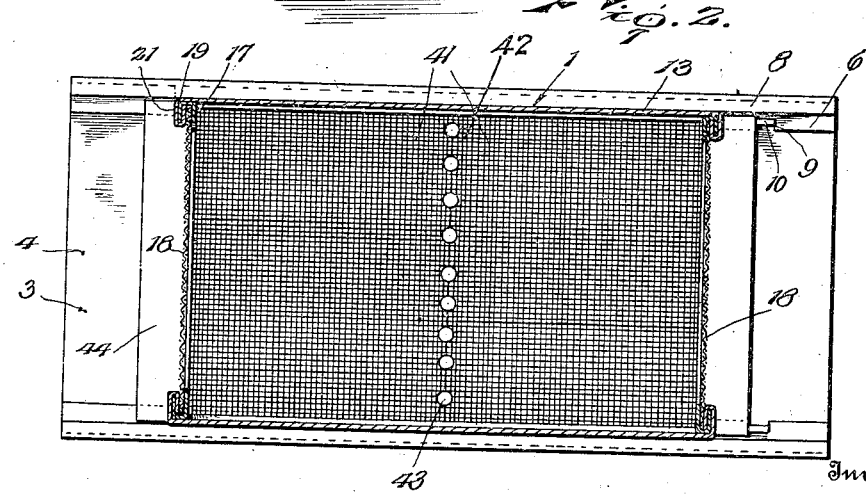
Figure 2 is a horizontal section view therethrough.
Figure 5:
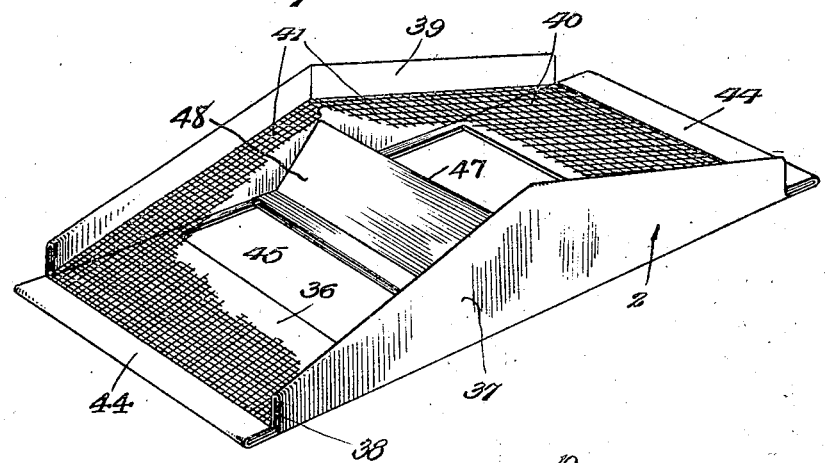
Figure 5 is a perspective view of the bottom of the trap with the cage removed.
Figure 6:
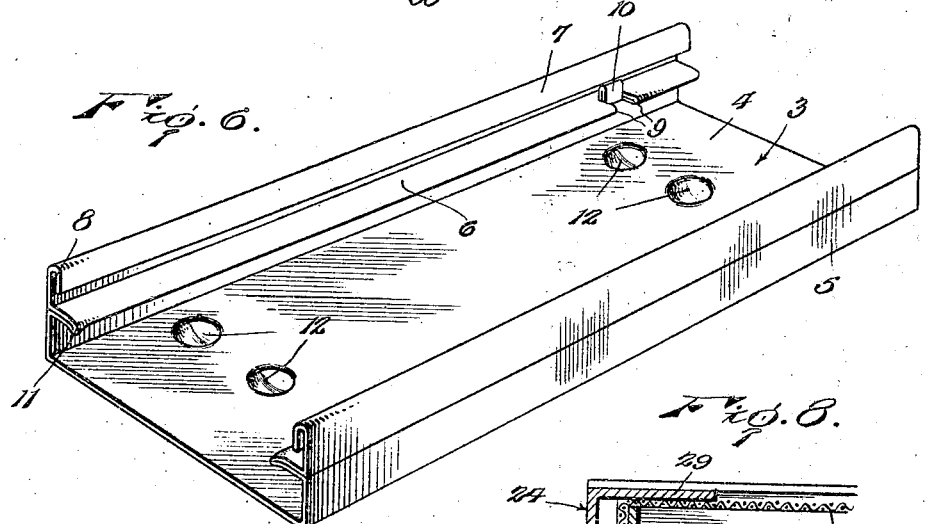
Figure 6 is a perspective view of the base of the trap.

The trap embodying the invention comprises essentially three parts, namely a cage which is indicated in general by the reference numeral 1 and which is most clearly shown in Figures 1, 2, 3, 4, 7 and 8 of the drawings, a bottom for the cage which is indicated in general by the numeral 2 and is best shown in Figure 5, and a base which is indicated in general by the numeral 3 and is best shown in Figure 6.

The base 3 is formed wholly of sheet metal and preferably from a single integral sheet of such material and the same comprises a bottom 4 preferably of oblong rectangular form and provided at its longitudinal edges with upstanding sides 5 occupying vertical planes and each folded longitudinally upon itself to provide a supporting ledge 6, the ledges 6 projecting horizontally inwardly toward each other from the two sides 5 and serving to support the cage 1 and bottom 2 of the said cage in a manner to be presently explained. The ledges 6 are spaced a considerable distance above the upper side of the bottom 4 of the base, and the sides 5 above the ledges are overturned upon themselves in an inward direction to provide guide flanges 7 spaced from the respective sides and extending longitudinally thereof and providing channels 8 which receive engaging flanges upon the opposite sides of the cage 1 as will presently be pointed out. Also for a purpose to be presently explained each ledge 6 is formed near one end with spaced incisions 9 and the material between these incisions is struck up to provide a stop lug 10. The ledges 6 at their opposite ends are slightly deflected in a downward direction as indicated by the numeral 11 so as to permit of the more ready assemblage of the cage and its bottom with the base 3. The bottom 4 of the base is provided in its upper side with any suitable number of depressions 12 which are designed to contain any suitable bait attractive to the insects.

Figure 8:
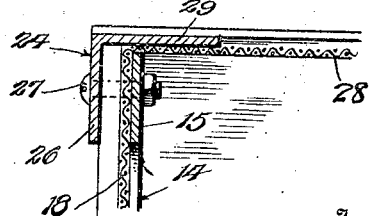
Figure 8 is a detail vertical sectional view on the line 8—8 of Figure 4.
Figure 7:
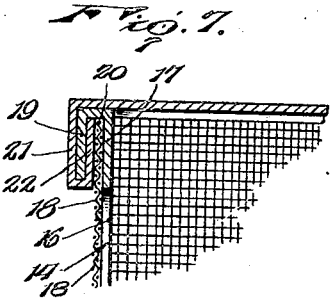
Figure 7 is a detail horizontal sectional view on the line 7—7 of Figure 3.

The cage 1 of the trap comprises side walls 13 which are of sheet metal and rectangular end frames 14 which are likewise of sheet metal and which comprise upper and lower connecting portions indicated respectively by the numerals 15 and 16 and vertical side portions 17. The end frames 14 have arranged within them sheets 18 of wire mesh material and the vertical edges of these sheets are secured by folding the side portions 17 back upon themselves, as indicated by the numeral 19, so as to provide pockets 20 to receive the said edge portions of the sheets 18. Also for the purpose of securing these edge portions of the foraminous sheets and for uniting the end frames at their vertical edges with the vertical edges of the side walls 13, the vertical edge portions of the said side walls are bent laterally inwardly at right angles as at 21 and thence back upon themselves, as at 22, to provide flanges engaging the flanges 19 and binding the edge portions of the sheet 18 against the said side portions 17 of the end frame. The lower edge portions of the sheets 18 are secured by bending the members 16 of the end frames 14 back upon themselves, as indicated by the numeral 23. The top of the cage is likewise of frame-like structure and comprises end members indicated in general by the numeral 24 and side members indicated in general by the numeral 25. The end members 24 have depending wings 26 which are located opposite the upper portions 15 of the end frames 14 and through which and the said portions 15 are passed bolts 27, these bolts passing also through the screens 18 and the parts being thus securely united. A sheet of wire mesh material 28 is arranged within the frame-like top of the cage and may either constitute a sheet separate from the sheets 18 which are arranged within the end frames, or the said sheets 18 and sheet 28 may constitute an integral part in which event the sheets at their line of juncture will extend over the upper edges of the portions 15 of the end frames 14, as best shown in Figure 8 of the drawings, the end members 24 of the top frame comprising, in addition to the wings 26, horizontally disposed wings 29 which project over the said upper edges of the portions 15 and for a short distance over the screen 28. The side members 25 likewise comprise vertically and horizontally disposed wings indicated respectively by the numerals 30 and 31, the wings 30 depending beside the upper portions of the side walls 13 of the cage and the wings 31 projecting horizontally over the side edge portions of the screen 28. Rivets or other suitable fastening elements 32 may be secured through the ends of the wings 31 of the side members 25 where the wings overlap the ends of the horizontal wings 29 of the end members 24.

From the foregoing it will be understood that in the illustrated embodiment of the invention the cage of the trap is closed upon opposite sides but has its ends and top covered by foraminous material so that there will be a free access of light to the interior of the cage to attract flies entering the trap beneath the bottom of the cage, as will be presently explained. However, the side walls 13 of the cage might likewise be formed partly of foraminous material if found desirable. In order to provide for assemblage of the cage with the base 3, the lower end portions of the side walls 13 of the cage are turned upwardly back upon themselves, as at 33, to provide upstanding flanges 34 adapted to slidably fit within the channels 8 when the parts are slid together in an endwise direction, the lower edges of the side walls 13 sliding over and resting upon the ledges 6. At this point it will be understood that by downwardly deflecting, as at 11, one end of each ledge 6, the first engaged end of the cage may be more readily assembled and its flanges 34 more readily guided into engagement with the channels 8 than would otherwise be the case.

The cage 1 may be provided at its top with any suitably formed handle 35 by which the trap may be carried about from place to place.

The bottom of the cage, which is clearly illustrated in Figure 5 of the drawings, and also in Figures 3 and 4, comprises a base portion 36 provided at its longitudinal edges with upstanding sides 37, this member being formed from sheet metal and the sides 37 being preferably integral with the longitudinal edges of the base portion 36 and formed by bending up the material. The sides 37 are of approximately triangular form although their ends are terminated abruptly as at 38 to provide shoulders adapted to engage against the inner sides of the lower members 16 of the end frames of the cage when the bottom is disposed within the lower portion of the said cage and this engagement serving to prevent relative endwise disengagement of the parts. The upper edge portions of the sides 37 are turned over upon themselves to provide flanges 39 which secure the lateral edges of a sheet 40 of wire mesh or other foraminous material, and cut to the triangular form of the said sides 37, the said sheet is thus arranged within oppositely inclined portions 41 constituting a baffle and inclining upwardly from the ends of the base portion 36 to the line of juncture of the said portions where they form a ridge 42 with a suitable number of openings 43 provided therein for the ingress of the insects. The end portions of the baffle sheet 40 are secured by bending over the end edge portions of the base 36, as indicated by the numeral 44, and thus the sheet 40 as a whole may be secured and bound at its edges without the employment of any extraneous fastening means. The base portion 36 of the cage body is preferably imperforate except at opposite sides of its intermediate portion where it is formed with transverse openings or slots 45 of sufficient dimentions to permit of the ready ingress of insects to the space between the said base portion 36 and the baffle sheet 40. It will be evident by reference to Figures 3 and 4 that the bottom 2 is to be assembled with the cage by fitting the bottom into the lower portion of the cage, the ends 38 of the sides 37 of the said bottom abutting against the lower portions of the end frames 14 of the cage as previously explained and the said sides 37 of the bottom projecting upwardly substantially in contact with the side walls 13 of the cage. Also it will be evident that the end frames of the cage rest at their lower edges upon the overturned flanges 44 of the base portion 36 of the body while the said flanged portions project beyond the planes of the said end frames. Also by reference to Figures 3 and 4 it will be observed that the side portions of the base 36 rest upon the edges 6 and one end of the said base portion 36 is designed to abut against the lugs 10 as the parts are slid together in the act of assemblage thus properly centering the cage with relation to the base 3.

It is a well known trait of the insects to be trapped that they will travel in the direction of light and therefore after being attracted by the bait within the depressions 12 they will be influenced to pass upwardly through the slots or openings 45 and into the space between the base portion of the bottom 2 and the baffle sheet 40, and in order to influence the insects to cause them to enter the cage proper through the openings 43, an imperforate baffle 48 is disposed within the said space and upon the intermediate portion of the base 36 and comprises opposite sides 47 having their lower edge portions flanged and turned back upon themselves, as at 48 and thus interlocked with the edges of the said intermediate portion of the base 36, the sides 47 extending between the sides 37 of the bottom 2 and the ridge through the juncture of the said sides 47 being located below and suitably spaced from the ridge 42 at the juncture of the inclined portions 41 of the baffle sheet 40.

Having thus described the invention, what is claimed as new is:

1. In a trap of the class described, a base having upstanding sides provided with supporting ledges upon their inner sides, a trapping compartment having an open lower end disposed between the said sides and to rest upon said ledges and supported thereby in spaced relation to the base, and a bottom for the said end of the trapping compartment bodily removably disposed therein and likewise supported upon said ledges.

2. In a trap of the class described, a base having upstanding sides provided with inwardly projecting supporting ledges and guiding channels extending above the ledges, and a trapping compartment slidably removably disposed and supported at its lower end upon the said ledges and provided with upstanding flanges at its sides engaging in the channels to restrain the compartment against upward displacement with relation to the base, the said end of the compartment having an ingress opening.

3. In a trap of the class described, a base having upstanding sides provided with supporting ledges and guiding channels, a trapping compartment having an open lower end slidably assembled with the base and resting upon the said ledges and provided with means engaging in the channels to restrain the compartment against upward displacement with relation to the base, and a bottom for the said lower end of the compartment removably fitted therein and supported upon the said ledges.

4. In a trap of the class described, a base having upstanding sides provided with inwardly projecting supporting ledges and guiding channels above the ledges, a trapping compartment having an open lower and slidably assembled with the base and resting upon the said ledges and supported thereby in spaced relation to the upper side of the base and provided with means engaging in the channels to restrain the compartment against upward displacement with relation to the base, and a bottom for the said lower end of the compartment bodily removably fitted therein and supported upon the said ledges independently of the compartment, the said bottom having means engaging beneath the lower end of the compartment whereby to restrain the bottom against upward displacement within the compartment.

5. In a trap of the class described, a base having upstanding sides provided with supporting ledges and guiding channels, a trapping compartment having an open lower end slidably assembled with the base and resting upon the said ledges and provided with means engaging in the channels to restrain the compartment against upward displacement with relation to the base, a bottom for the said lower end of the compartment removably fitted therein and supported upon the said ledges, and means in the path of sliding movement of the compartment upon the ledges for limiting such movement.

6. In a trap of the class described, a base having upstanding sides provided with supporting ledges and guiding channels, a trapping compartment having an open lower end slidably assembled with the base and resting upon the said ledges and provided with means engaging in the channels to restrain the compartment against upward displacement with relation to the base, a bottom for the said lower end of the compartment removably fitted therein and supported upon said ledges, and means in the path of sliding movement of the compartment upon the ledges for limiting such movement, the said means being located near one end of the base and the ledges at the opposite end of the base being deflected to permit of ready initial engagement of the compartment with the ledges.

7. In a trap of the class described, a trapping compartment having an ingress opening in its bottom, said compartment comprising side and end walls provided with interlocking uniting flanges, one of the walls being open and a foraminous covering for said wall engaged and retained by the respective flanges.

8. In a trap of the class described, a trapping compartment having an ingress opening and comprising side and end walls, one of said walls comprising a frame and it and the walls between which it extends being provided with interlocking flanges, and a foraminous sheet extending over the said frame wall and marginally secured by the said flanges.

9. In a trap of the class described, a trapping compartment having an ingress opening and comprising rectangularly disposed walls, certain relatively opposite walls comprising frames, the said compartment further comprising a top frame, a foraminous sheet extending continuously over all of said frames, and interlocking flanges upon the first-mentioned walls and the walls between which they extend, said flanges connecting the said walls and also marginally securing the said foraminous sheet.

10. In a trap of the class described, a base having supporting means, a trapping compartment supported at its lower end thereon and having its said end open, a bottom for the said end of the compartment removably assembled therewith and having upstanding sides extending into the said end of the compartment and abutting at their ends against opposite walls of the compartment whereby to restrain the parts against relative displacement, the said bottom having an ingress opening, the bottom having a base portion spaced below the opening and likewise provided with an ingress opening, and an imperforate baffle inclined upwardly between and from the said openings.

In testimony whereof I affix my signature.

JOHN W. SKELTON. [L. S.]